(12) United States Patent
Buckley

(10) Patent No.: US 6,542,173 B1
(45) Date of Patent: Apr. 1, 2003

(54) SYSTEMS, METHODS AND GRAPHICAL USER INTERFACES FOR PRINTING OBJECT OPTIMIZED IMAGES BASED ON DOCUMENT TYPE

(75) Inventor: Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,270

(22) Filed: Jan. 19, 2000

(51) Int. Cl.⁷ .............................. G06F 3/00; G06F 3/14; G06K 15/00
(52) U.S. Cl. ........................ 345/841; 345/810; 358/1.9; 715/513
(58) Field of Search ................................. 345/764, 810, 345/841; 358/1.9, 1.11, 1.18; 707/513, 528, 529, 542

(56) References Cited

U.S. PATENT DOCUMENTS

| | | | | |
|---|---|---|---|---|
| 5,579,446 | A | | 11/1996 | Naik et al. .................... 395/109 |
| 5,687,303 | A | | 11/1997 | Motamed et al. ........... 395/117 |
| 5,704,021 | A | | 12/1997 | Smith et al. ................. 395/109 |
| 5,729,632 | A | * | 3/1998 | Tai ........................... 358/1.9 X |
| 5,991,515 | A | * | 11/1999 | Fall et al. ............... 358/1.18 X |
| 6,046,818 | A | * | 4/2000 | Benson ....................... 358/1.18 |
| 6,243,172 | B1 | * | 6/2001 | Gauthier et al. ........... 358/1.18 |
| 6,252,677 | B1 | * | 6/2001 | Hawes et al. ................ 358/1.9 |
| 6,327,043 | B1 | * | 12/2001 | Rumph et al. ........... 358/1.9 X |

OTHER PUBLICATIONS

"The Xerox 5775 Digital Color Copier/Printer with the EFI Fiery Controller—Image Quality Guide", Xerox Corporation, Rochester, New York, Jul. 1992.

"A Color 635/630 User Guide", Xerox Corporation, 1993.

* cited by examiner

Primary Examiner—John Cabeca
Assistant Examiner—X. L. Bautista
(74) Attorney, Agent, or Firm—Oliff & Berridge, PLC

(57) ABSTRACT

Conventionally, the rendering parameter options are set independently of a document. Each object is rendered independently. For documents having many independent objects, this requires significant computational resources and time. However, many documents have a predominant document type. For such documents, it is often sufficient to identify the document type. Then, predetermined rendering techniques are applied to the objects within that document based on the determined document type. Alternatively, a user may be interested in one type of object to the exclusion of the other types of objects. Accordingly, optimally rendering objects whose quality the user is indifferent to wastes resources. Document type based rendering systems, methods and graphical user interfaces define rendering parameter options for rendering the objects of a document based on an identified document type, irrespective of the object types of that document's objects. The document type based rendering systems, methods and graphical user interfaces optionally determine a document's predominant object and apply rendering parameter options to that document's objects based on the determined predominant object type. The document type based rendering systems, methods and graphical user interfaces permit document optimized rendering parameter options to be defined. The document type based rendering systems, methods and graphical user interfaces apply two or more sets of rendering parameter options to different types of objects of a document, based on a document type selected or determined for that document.

17 Claims, 5 Drawing Sheets

SYSTEMS, METHODS AND GRAPHICAL USER INTERFACES FOR PRINTING OBJECT OPTIMIZED IMAGES BASED ON DOCUMENT TYPE

BACKGROUND OF THE INVENTION

1. Field of Invention

This invention is directed to systems, methods and graphical user interfaces that enable document optimized printing of different types of image objects.

2. Background of the Invention

As color printers, including color ink jet printers, color laser printers and digital color copiers and the like, have become more sophisticated, users of such color printers have required more sophisticated rendering of the various portions of mixed content documents. Such mixed content documents can include text portions, graphics portions and photograph portions.

Prior to the advent of high quality computer generated documents, documents, such as newspapers, newsletter, magazines and the like, were formed by graphic artists composing the documents by hand. Thus, in such hand-composed documents, each different type of object within the documents, such as text, photographs, constant color areas or graphs such as pie charts, and sampled or continuously changing images such as sweeps, was optimally formed independently of any other type of object.

Because these page images were composed by hand, each type of object was inherently treated independently of the other objects. Thus, for example, the optimal halftoned screen design for photographs, which differs from the optimal halftone screen designs for constant color areas and text, could be selected and the selected screen arranged to an optimal angle.

Initially, color printers, such as color ink jet printers, rendered each document with a unitary set of rendering techniques. Thus, a single halftone screen was applied to each of the different types of image areas in a page, including the text areas, the photographic areas, the sampled image areas and the constant color areas, regardless of whether that halftone screen was appropriate for that image area. This was true for any other rendering parameter, such as the color settings, the gamut settings, the type of compression used, and the like.

U.S. Pat. No. 5,687,303 to Rumph et al., incorporated herein by reference in its entirety, discloses systems and methods for treating each object of an electronic document independently of the other objects. Thus, the appropriate rendering parameter options could be selected for each different type of object and applied to each different type of object independently of the parameters selected for the other types of objects. U.S. Pat. Nos. 5,579,446 to Naik et al. and 5,704,021 to Smith et al. disclose various graphical user interfaces that allow different color control options and different halftoning techniques to be independently applied to text objects, graphics objects and photo objects. In particular, in the 446 and 021 specification, the user has the option of manually selecting the rendering options or allowing the system to apply default rendering options to each different type of object.

SUMMARY OF THE INVENTION

However, the systems and graphical user interfaces disclosed in the 446 and 021 patents set the rendering parameter options independently of a particular document. Similarly, the systems and methods disclosed in the 303 patent render each object using the selected set of rendering parameter options for that object's type, as modified by any provided rendering tags or hints. All of the 303, 446 and 021 patents render each object independently. For documents having many independent objects, this can require significant computational resources and/or a long time to complete.

However, many documents have a predominant document type. That is, in many documents, a predominant number of the independent objects have the same object type, or more generally, the same content type. For example, many documents have a large number of independent text objects, with a relatively small number of graphics type objects and/or photo type objects appearing in the document. Thus, determining the object type of each of the independent objects and applying different rendering techniques based on each object's determined object type is unnecessarily resource and time consuming. Rather, for such documents, it is often sufficient to merely identify a document type for that document, with a predetermined set of rendering techniques to be applied to all of the objects within that document based on the determined document type. In other situations, such as printing an HTML document from an accessed website, a user may be interested in one type of object, such as the text objects, the bitmap objects, the photograph objects or the graphics objects, to the exclusion of the other types of objects. For example, the user may be interested in the text of an article on a newspaper website and thus does not care whether the non-text objects within that web page are optimally rendered. In these examples, optimally rendering each of the various independent objects within the document may unnecessarily consume valuable computational and/or time resources in order to print at an optimized quality level objects whose quality the user is indifferent to.

Accordingly, this invention provides systems, methods and graphical user interfaces for defining a set of rendering parameter options for rendering the independent objects of a document based on an identified document type, irrespective of the particular content type or object type of each of the objects making up that document.

This invention separately provides systems, methods and graphical user interfaces that automatically determine a predominant object type of a document and that apply a set of rendering parameter options to all of the objects of that document based on the determined predominant object type.

This invention separately provides systems, methods and graphical user interfaces that permit a user to define a set of document optimized rendering parameter options for rendering a document.

This invention separately provides systems, methods and a graphical user interface that apply two or more sets of rendering parameter options to different types of objects of a documents, based on a document type selected or determined for that document.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures wherein.

DETAILED DESCRIPTION OF PREFERRED EMBODIMENTS

Figure 1:
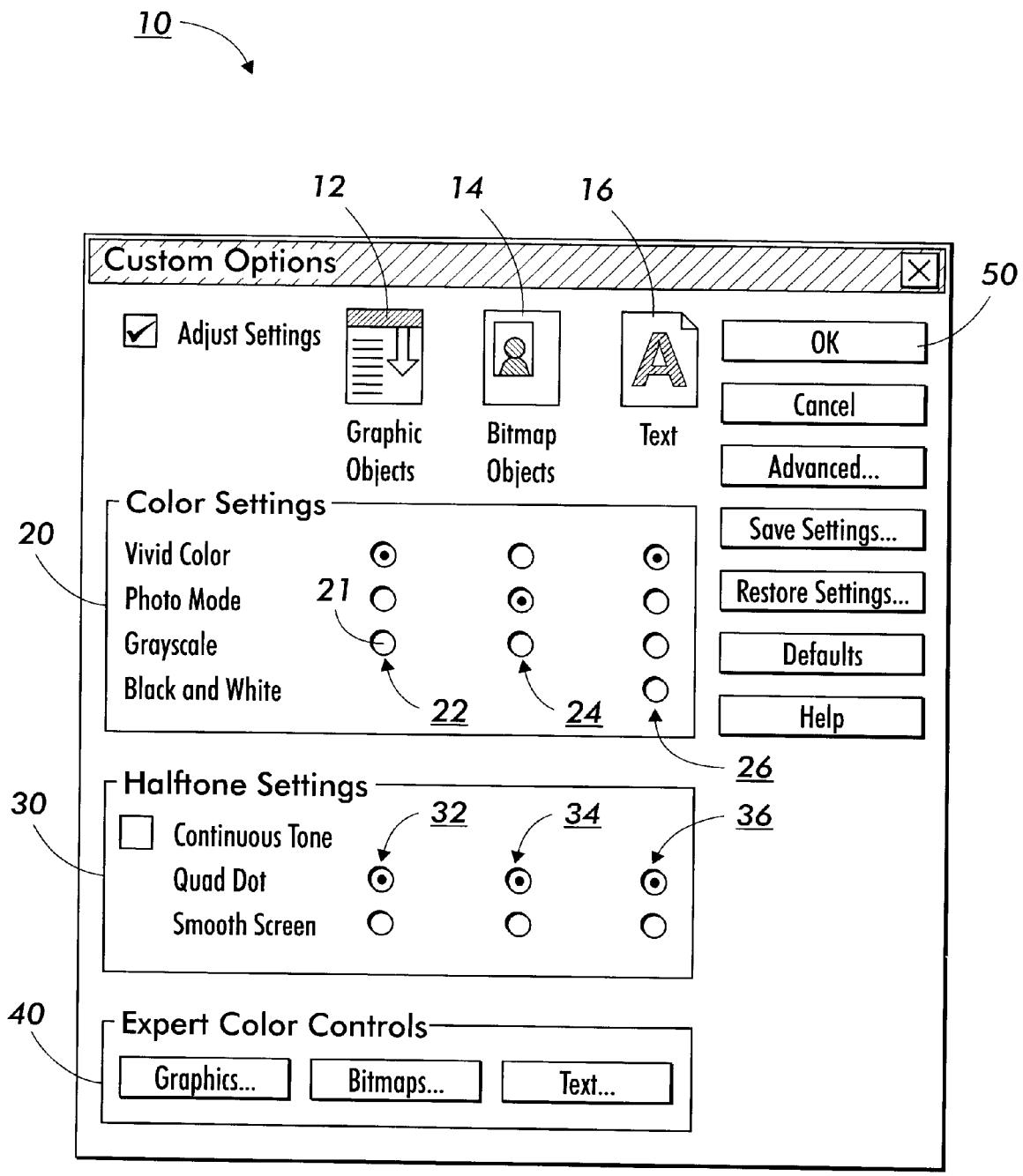
FIG. 1 (Prior Art) is a conventional object oriented graphical user interface for selecting rendering options.

FIG. 1 is an exemplary embodiment of a manual color option graphical user interface as described in the 446 and 021 patents. In particular, as shown in FIG. 1, this conventional graphical user interface 10 defines three different type of image objects: graphical objects 12, bitmap objects 14 and text objects 16. The graphical user interface 10 includes a color setting parameter section 20, a halftone parameter setting section 30 and an expert color control portion 40. The color parameter setting portion 20 includes a first set of 22 of radio buttons 21 for selecting the color parameter option for the graphical objects 12, a second set 24 of radio buttons 21 for selecting the color parameter option for the bitmap objects 14 and a third set 26 of radio buttons 21 for selecting the color parameter option for the text objects 16. As shown in FIG. 1, one set of selected color rendering parameter options can include using vivid color parameter for the graphical objects 12, photo mode parameters for the bitmap objects 14 and vivid color parameters for the text objects 16. Similarly, the halftone parameter setting portion 30 includes three sets 32, 34 and 36 of radio buttons 21 for the graphical objects 12, the bitmap objects 14 and the text object 16, respectively. As shown in FIG. 1, one set of selected halftone rendering parameter options includes using the quad dot halftone parameter for all of the different types of objects.

The expert color control portion 40 allows the user to control each of the selected options for the rendering parameters for each of the graphics objects 12, the bitmap objects 14 and the text objects 16 at a finer resolution.

As indicated above, once the user selects the different rendering parameter options for each of the available rendering parameters for each of the different types of objects, the user clicks the OK button 50 of the conventional manual color option graphical user interface 10 to begin printing documents using the selected rendering parameter options for the various rendering parameters. If the user needs to change the selected option for one or more of these rendering parameters, the user must once again access the manual color option graphical user interface 10, click on the appropriate radio button 21 for the appropriate rendering parameter option of the appropriate rendering parameter for the appropriate object, for each rendering parameter the user wishes to change. Once the user has finished changing the selected rendering parameter options, the user again clicks the OK button 50 and continues printing documents using the revised set of selected rendering parameter options.

Should the user wish to further revise the set of selected rendering parameter options, or to return to a set of previously selected rendering parameter options, the user must once again access the manual color option graphical user interface 10, and select the radio button 21 corresponding to the desired rendering parameter option for the desired rendering parameter for the desired type of object. Then, after all of the rendering parameter options have been either been updated or returned to their previous values, the user must select the OK button 50 to accept the revised rendering parameter options and to begin printing with those selected rendering parameter options.

In contrast, according to the systems, methods and graphical user interfaces of this invention, rather than requiring the user to define a particular rendering parameter option for each of a plurality of rendering parameters for each of a plurality of different types of image objects, the user need only define a single set of rendering parameter options for each different type of document. In general, each of these different sets of rendering parameter options for a different document type will include a different set of rendering parameter options or capabilities. Each document type can be independently addressed using either or both of a page description language or a user interface presiding in a local print driver and/or on a print server. In particular, each different document type has an associated set of rendering methods. For example, a text document type may be set up to optimally print black and white images using halftoning techniques, tone reproduction curves, compression techniques and the like that are appropriate for text objects. A photo document type will include the same general set of rendering parameters, with the particular options for each rendering parameter selected appropriately for photo objects. Similarly, a graphics document type will include rendering parameter options selected for the set of rendering parameters that are appropriate for graphics objects.

It should be further be appreciated that one or more mixed content document types could be defined. For example, a text/photo document type could be defined, where a first set of rendering parameter options is applied to all text objects, while a second set of rendering parameter options is applied to all non-text objects. It should be appreciated that, while such mixed content document types apply more than a single set of rendering parameter options to the various objects of the document based on the particular object type of each object, the application of such different sets of rendering parameter options is ultimately controlled by the particular selected or determined document type for the document being rendered.

In various exemplary embodiments of the systems, methods and graphical user interfaces according to this invention, the document type, and thus the set of rendering parameter options associated with that document type, applied to render a particular document, is selected by the user through a graphical user interface. In various ones of the exemplary embodiments, once the user has selected a particular document type, each subsequent document is rendered using the set of rendering parameter options associated with the selected document type.

In other various exemplary embodiments according to this invention, if an automatic mode has been selected, a statistical analysis, or some other type of analysis, is performed on the document to be printed to determine its predominant document type. Then, that document is rendered using the set of rendering parameter options associated with the determined document type.

Each of the different document types defines a different set of selected rendering options, and may define more than one such set of selected rendering parameter options. Thus, selecting or automatically determining the document type of the document to be rendered, and using the one or more sets of selected rendering parameter options associated with that document type, allows the user to easily select one or more sets of rendering parameter options for each document to be printed. That is, because the document types persist in time, the user can define a set of desired rendering parameter options for each document type. Thus, that set of rendered parameter options can be re-used simply by selecting the document type to be used to control the rendering of the document to be printed. In this way, the user can avoid having to continually access the conventional manual color option graphical user interface 10 shown in FIG. 1 to obtain a desired set of rendering parameter options.

Figure 2:
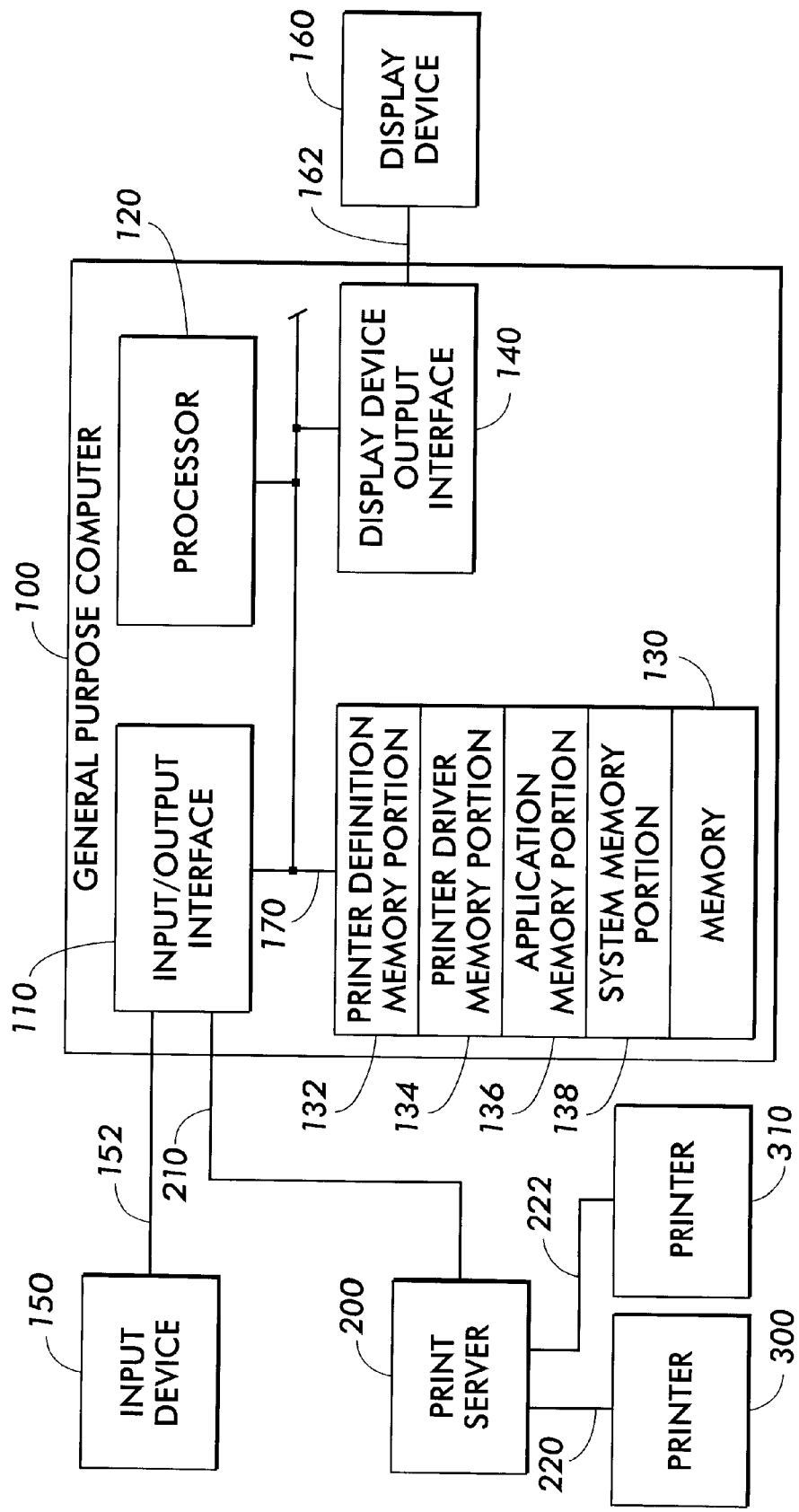
FIG. 2 is a block diagram of one exemplary embodiment of a system for document optimized rendering according to this invention.

FIG. 2 is a functional block diagram of a general purpose computer 100 on which the systems, methods and graphical user interfaces of this invention can be used. As shown in FIG. 2, the general purpose computer 100 includes an input/output interface 110, a processor 120, a memory 130 and a display device output interface 140, each connected to a data/control bus 170. The input/output interface 110 is connected to an input device 150 over a link 152. The input device 150 can be one or more of a keyboard, a mouse, a track ball, a track pad, a touch screen, or any other known or later developed device for inputting data and/or control signals to the general purpose computer 100. A display device 160 is connected over a link 162 to the display device output interface 140. The display device can be any known or later developed device that is capable of displaying the various graphical user interfaces according to this invention. Thus, the display device 160 can be a cathode ray tube-type monitor, a flat screen monitor, a luminescent LCD monitor or the like.

The general purpose computer 100 is generally connected over a link 202 to an image data source 200. In general, the image data source 200 can be any one of a number of different devices or systems, such as a scanner, a digital copier, a facsimile device that is suitable for generating electronic image data, or a device suitable for storing and/or transmitting electronic image data, such as a client or server of a network, or the Internet, and especially the World Wide Web. Thus, it should be appreciated that the image data source 100 can be any known or later developed device or system that is capable of supplying documents comprising one or more independent image objects to the general purpose computer 100 over the link 202.

It should further be appreciated that the one or more independent image objects of a document can be independent image regions that are identified or determined by segmenting an otherwise unitary document. That is, the image objects can be portions of a document identified by applying any known or later developed image segmentation technique to that document. Because segmentation techniques are well known in the art and play no part of the systems, methods and graphical user interfaces of this invention, these segmentation techniques will not be described in detail herein.

The general purpose computer 100 is generally connected over a link 302 to a printer server 300. The printer server 300 is usually connected or connectable to one or more printers, such as the printer 310, which is connected over a link 312 to the printer server 300.

Each of the various links 152, 162, 202, 302 and 312 can be any known or later developed device or system for connecting the input device 150, the image data source 200, and/or the printer server 300 to the input/output interface 110, for connecting the display device 160 to the display device output interface 140, and for connecting the printer 310 to the print server 300. In particular, each of the links 152, 162, 202, 302 and 312 can be implemented as any one of a direct cable connection, a connection over a wide area network or a local area network, a connection over an intranet, a connection over an extranet, a connection over the Internet, a connection over any other distributed processing network or system, or an infrared or other wireless connection.

For example, the link 152 connecting the input device 150 to the input/output interface 110 and the link 162 connecting the display device 160 to the display device output interface 140 can be direct cable connections, while the links 202, 302 and 312 connecting the image data source 200 and the print server 300 to the input/output interface 110 and the print server to the printer 310 are usually different portions of a local area network or one or more other distributed networks. It should also be appreciated that either or both of the image data source 200 and/or the print server 300 can also be incorporated directly into the general purpose computer 100.

It should also be appreciated that the printer 310 can be directly connected to the input/output interface 110. In this case, the links 302 and 312 would be replaced by a direct cable connection between the printer 310 and the input/output interface 110. In general, the links 152, 162, 202, 302 and 312 can be any known or later developed connection system or structure usable to interconnect the various elements described above.

Moreover, while FIG. 2 shows the image data source 300 and the printer 310 as elements independent of the general purpose computer 100 being used to select the document type according to this invention, the general purpose computer 100, the input device 150, the display device 160 and either or both of the image data source 300 and/or the printer 310 may be combined together as an integrated device, such as a digital copier, a computer having a built in printer, or any other integrated devices capable of supplying image data comprising one or more objects and/or capable of producing a hard copy image output.

As is shown in FIG. 2, the memory 130 contains a number of different memory portions, including a document-type definition memory portion 132, a printer driver memory portion 134, an application memory portion 136 and a system memory portion 138. It should be appreciated that the memory 130 can include long-term storage memory, such as hard disks and disk drives, floppy disks and disk drives, CD-ROM disks and disk drives, and the like. The memory 130 will also include nonvolatile memory such as read-only memory, flash memory and the like. Finally, the memory 130 will include alterable memory, which is usually random access memory, but can be any other known or later developed type of alterable memory.

The system memory portion 130 includes the system programs and drivers that provide the basic input/output and operating system functions for the general purpose computer 100. The application memory portion 136 includes any currently executing programs, such as Internet and other document browsers, word processing programs, graphics programs and the like, that the user can use to open new or stored files and to send the contents of the opened files to the printer 310. The printer driver memory portion 134 stores printer drivers for the particular ones of the printers 310 and the like that the user can direct print jobs to through the printer server 300. In particular, according to the systems, methods and graphical user interfaces of this invention, the printer driver memory 134 stores printer drivers that allow multiple document types to be defined and that interact with the display device output interface 140, under control of the processor 120, to display on the display device 160 the graphical user interfaces according to this invention. Similarly, the printer drivers stored in the printer driver memory portion 134 allow users to provide user inputs input via the input device 150 through the input/output interface 110, under control of the processor 120, to the printer drivers.

The document-type definition memory portion 134 stores the various document-type definitions, where each document type includes one or more sets of one or more selected rendering parameter options for rendering document of that document type. It should be appreciated that the various different document types can be defined by an authorized user, such as, for example, a system administrator. In addition, or alternatively, at least one of the various different document types could be stored into the document-type definition memory portion 134 when the printer driver graphical user interface is first installed into the general purpose computer 100. In this case, the at least one of the various different document types would be predefined when the printer driver graphical user interface is programmed.

In operation, once the user has defined one or more document types and has opened a document that the user wishes to print, the user accesses the printer driver graphical user interface for the currently selected one of the available printers. The user can access the printer driver graphical user interface using any known or later developed method, such as by selecting the appropriate drop-down menu item, clicking the appropriate toolbar button, or the like. The user can then select, or change the selection of, one of the previously defined document types that the user wishes to use to print the various objects in the currently opened document.

Alternatively, in various other exemplary embodiments of the systems, methods and graphical user interfaces according to this invention, once the user has defined one or more document types and has opened a document that the user wishes to print, the user accesses the print driver graphical user interface for the currently selected one of the available printers. The user can then select an autodetermination mode. In the autodetermination mode, the currently opened document that the user wishes to print is analyzed to determine the one of the previously defined document types to be used to print the various objects in the currently opened document.

In particular, in various exemplary embodiments of the systems, methods and graphical user interfaces of this invention, the currently opened document is statistically analyzed to identify at least one predominant object type in the currently opened document. If a single predominant object type is determined, the document type corresponding to the object type is selected as the document type to be used to render the currently opened document. In contrast, if two or more object types are roughly equivalently predominant, a mixed content document type that corresponds to the roughly equivalent image object types will be automatically selected, if such a mixed content document type has been defined. Otherwise, the document type corresponding to the most-predominant image object type can be selected. Alternatively, a default document type can be selected.

It should be appreciated that any known or later developed method for analyzing the currently selected document can be used to determine the predominant image object type. For example, the gross number of objects having each object type can be compiled. Alternatively, the proportion of the entire document represented by each of the different object types can be determined. Moreover, the results of the analysis, such as the raw numbers for either the total number of objects of each type or the total proportion of a document represented by objects of each type, can be weighted based on user defined preferences when automatically determining the document type.

Once the user has selected the particular document type to be used to render the currently opened document, or the document type be to be used to render the currently opened document has been automatically determined, the user inputs a signal to the printer driver through the graphical user interface, usually by selecting the "OK" button, that the printer driver is to output the appropriate data and control signals to the currently selected printer to cause that currently selected printer to render the currently opened document using the rendering parameter options of the selected or determined document type.

In particular, the printer driver for the currently selected printer, which is stored in the printer driver memory portion 134, accesses, under control of the processor 120, the appropriate rendering parameter options for the selected document type that is stored in the document-type definition memory portion 132. Then, under control of the processor 120, the printer driver stored in the printer driver memory portion 134 communicates with the currently opened document that is stored, along with the appropriate application program for that document, in the application memory portion 136. The printer driver, using the defined rendering parameter options of the selected document type stored in the document-type definition memory portion 132, converts the currently opened document into printer data and printer control commands and outputs the printer data and printer control commands through the input/output interface 110, the links 302 and 312 and the print server 300 to the currently selected printer 310.

It should be appreciated that, in various exemplary embodiments, either or both of the printer driver and the various document-type definitions may be stored in the print server 300 and/or the printer 310 rather than the general purpose computer 100. Similarly, it should be appreciated that the printer driver and the various document-type definitions may be implemented in firmware and/or hardware on any one of the general purpose computer 100, the print server 300 and/or the printer 310. Thus, it should be appreciated that any particular implementation of the printer driver and the various document-type definitions according to this invention is not critical, such that any particular implementation of the printer driver and the various document-type definitions is within the scope of this invention.

Figure 3:
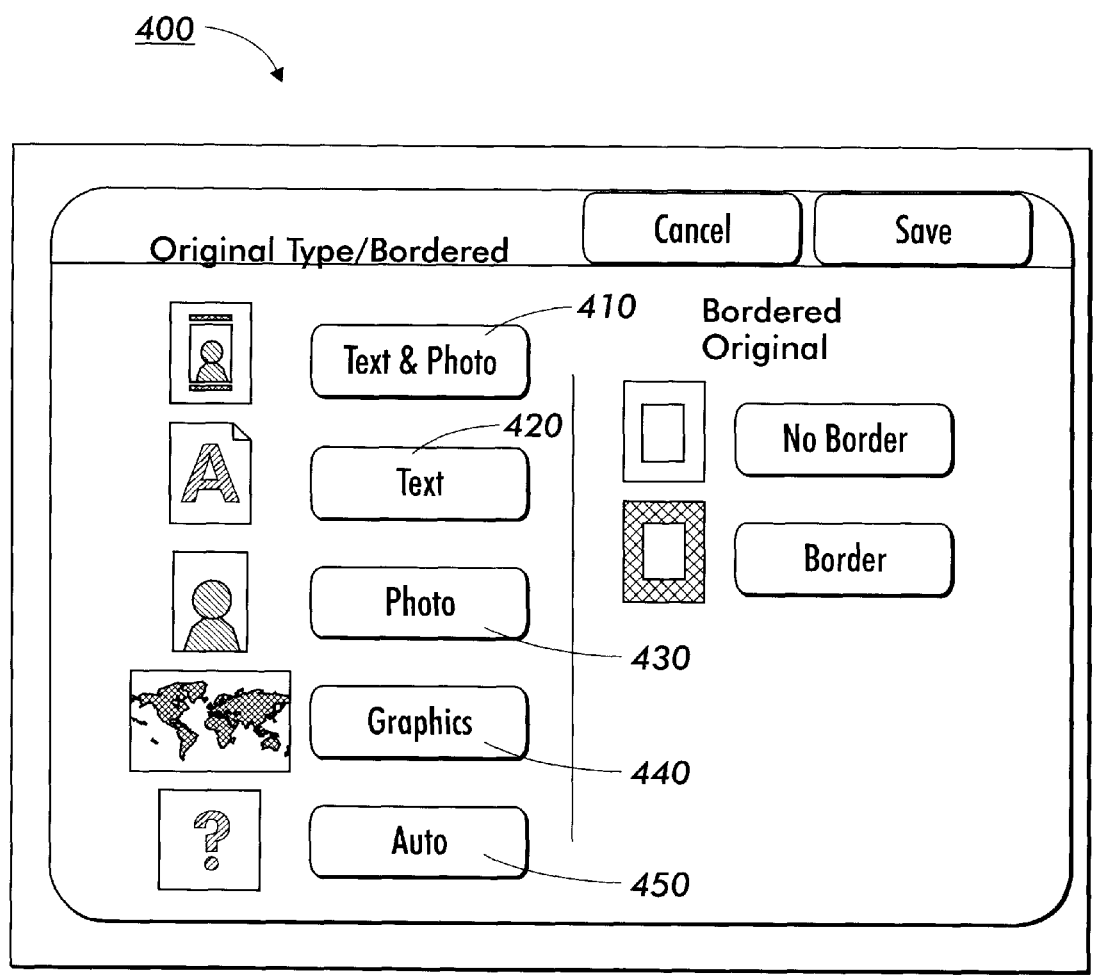
FIG. 3 is a graphical user interface for selecting a document type for document optimized rendering according to this invention.

FIG. 3 is one exemplary embodiment of a document type selection graphical user interface 400 for selecting the document type according to this invention. As shown in FIG. 3, the graphical user interface 400 includes a number of document type selection buttons, including a text/photo document type selection button 410, a text document type selection button 420, a photo document type selection button 430, a graphics document type selection button 440, and an automatically determined document type selection button 450. When the text document type selection button 420 is selected, the various objects of any subsequently printed documents will be rendered using the particular rendering parameter options previously selected for text-type documents, regardless of the actual object types of the various objects of that document.

Similarly, when the photo document type selection button 430 or the graphics document type selection button 440 is selected, the various objects of any subsequently printed documents will be rendered using the particular rendering parameter options previously selected for photo-type documents or for graphics-type documents, respectively, regardless of the actual object types of the various objects of that document.

However, when the text/photo document type selection button 410 is selected, rather than applying a single set of previously selected rendering parameter options to all of the objects of any subsequently printed document, text-type objects will be rendered using a set of rendering parameter options selected for text-type objects. In contrast, all other types of objects will be rendered using a set of rendering parameter options selected for photo-type objects. In this case, the object types of the various objects will have to be determined. It should be appreciated that any known method for determining the object type of an object, such as those disclosed in the incorporated 303 patent, can be used. Additionally, any later developed method for determining the object type of an object could be used instead.

When the automatically determined document type selection button 450 is selected, each subsequently printed document is first analyzed to determine the predominant object type for that document. As discussed above, any known or later developed method for determining the predominant object type for that document can be used. Such methods include determining the most common object type of that document, determining the object type of the objects occupying the most area of the printed document, or the like.

Once the predominant object type for that document has been determined, an implemented document type corresponding to that predominant object type is selected as the document type to be used when printing that document. For example, if text-type objects predominate in a particular document, the text document type is automatically selected. Then, the various objects of any subsequently printed documents will be rendered using the particular rendering parameter options previously selected for text-type documents, regardless of the actual object types of the various objects of that document.

Additionally, if multiple-type document types, such as the text/photo document type discussed above, are implemented, an appropriate multiple-type document type can be automatically selected if no single object type is predominant. For example, if text type objects make up 45% of the objects in a document, photo objects make up 40% of the objects of that document, and graphics objects make up the remaining 15% of the objects of that document, and the text/photo document type has been implemented, then the text/photo document type would be appropriately automatically selected for that document. Then, the text-type objects will be rendered using the set of rendering parameter options selected for text-type objects. In contrast, all other types of objects will be rendered using the set of rendering parameter options selected for photo-type objects. Of course, if the text/photo document type was not implemented, then the text document type would be appropriately automatically selected for that document.

Figure 4:
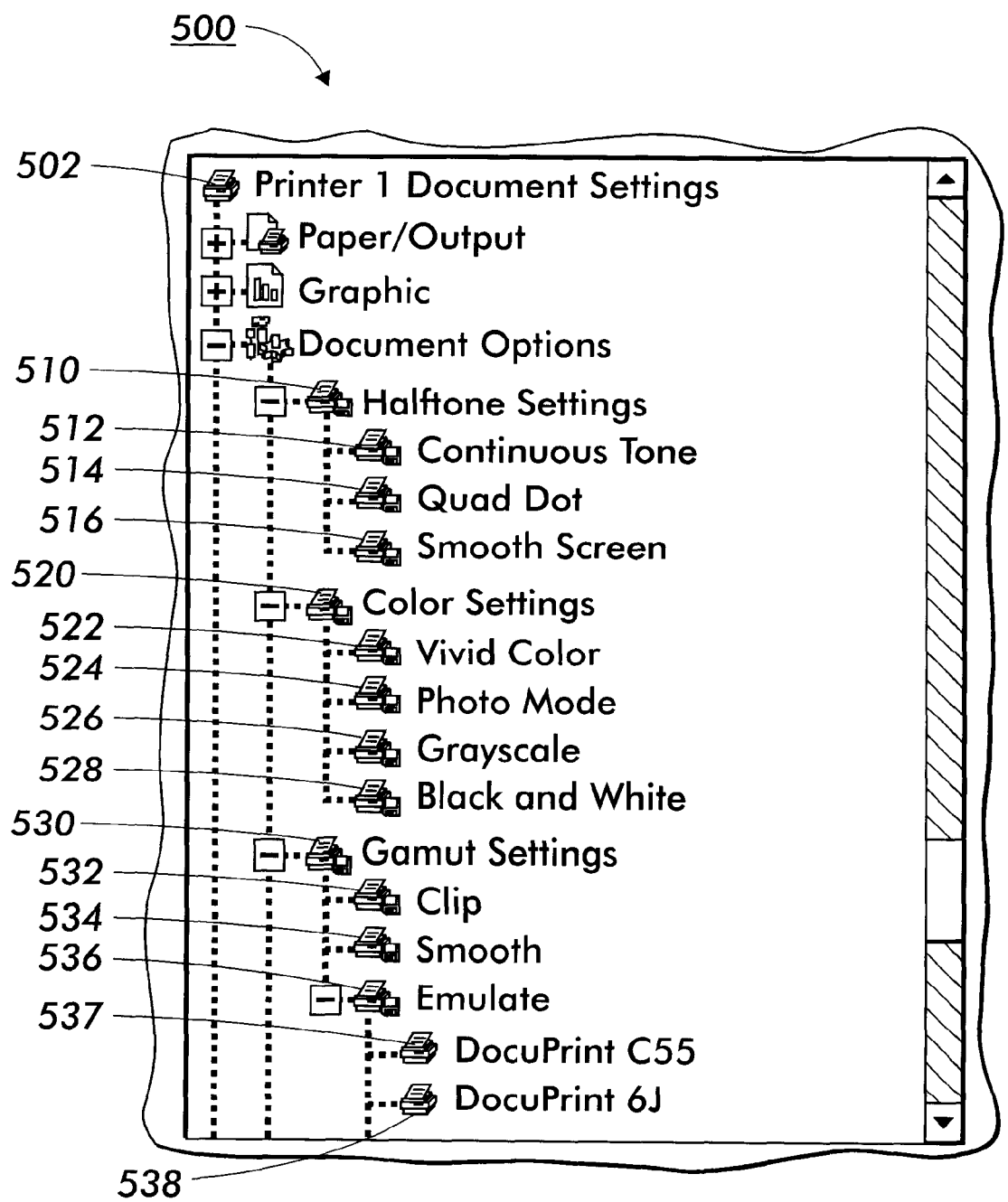
FIG. 4 is a first exemplary embodiment of a graphical user interface for selecting the rendering parameter options for a particular document type.

FIG. 4 shows one exemplary embodiment of a document type rendering parameter options selection graphical user interface 500 that allows the user to define the document type rendering parameter options for each particular document type that is implemented in the document type selection graphical user interface 400 shown in FIG. 3. As shown in FIG. 4, for an arbitrary document type "document type 1" 502, the document type rendering parameter options selection graphical user interface 500 includes a halftone settings portion 510, a color settings portion 520, a gamut settings portion 530 and the like. In particular, the halftone settings portion 510 includes the halftone rendering options continuous tone 512, quad dot 514 and smooth screen 516. Similarly, the color settings portion 520 includes a vivid rendering option 522, a photo rendering option 524, a gray scale rendering option 526 and a black and white rendering option 528. Likewise, the gamut settings portions 530 includes a clip rendering option 532, a smooth rendering option 534 and an emulate rendering option 536. In particular, the emulate rendering option 536, if selected, allows the user to select which of one or more different printer types are to be emulated. Thus, as shown in FIG. 4, the emulate rendering option 536 has a DocuPrint C55 emulation option 537 and a DocuPrint 6J emulation option 538. It should also be appreciated that the document type rendering parameter options selection graphical user interface 500 could also include document type rendering parameter options defining particular compression techniques and the particular parameters for a selected compression technique. The selected compression technique would then be used when transmitting data identified as being of the arbitrary document type "document type 1" 502 across a network, when storing that data, or the like.

In operation, to define the rendering options for the document type "document type 1" 502, the user selects one of the different rendering parameter options for each of the rendering parameters. It should be appreciated that, if the user does not explicitly select a particular rendering parameter option, a default rendering parameter option can be used. It should further be appreciated that the default rendering parameter options can be specified in any of a variety of way, including being specified by an authorized user, such as, for example, a system administrator, being specified during programming of the document type rendering parameter options selection graphical user interface 500, programmed into an image output device driver that has been install on the general purpose computer 100 or the like.

It should further be appreciated that the exemplary embodiment of the document type rendering parameter options selection graphical user interface 500 shown in FIG. 4 is particularly useful for selecting the rendering options to be applied to all of the objects of the document to be printer, when the document type 1 502 is selected, regardless of object types of the various objects making up the document to be printed.

Figure 5:
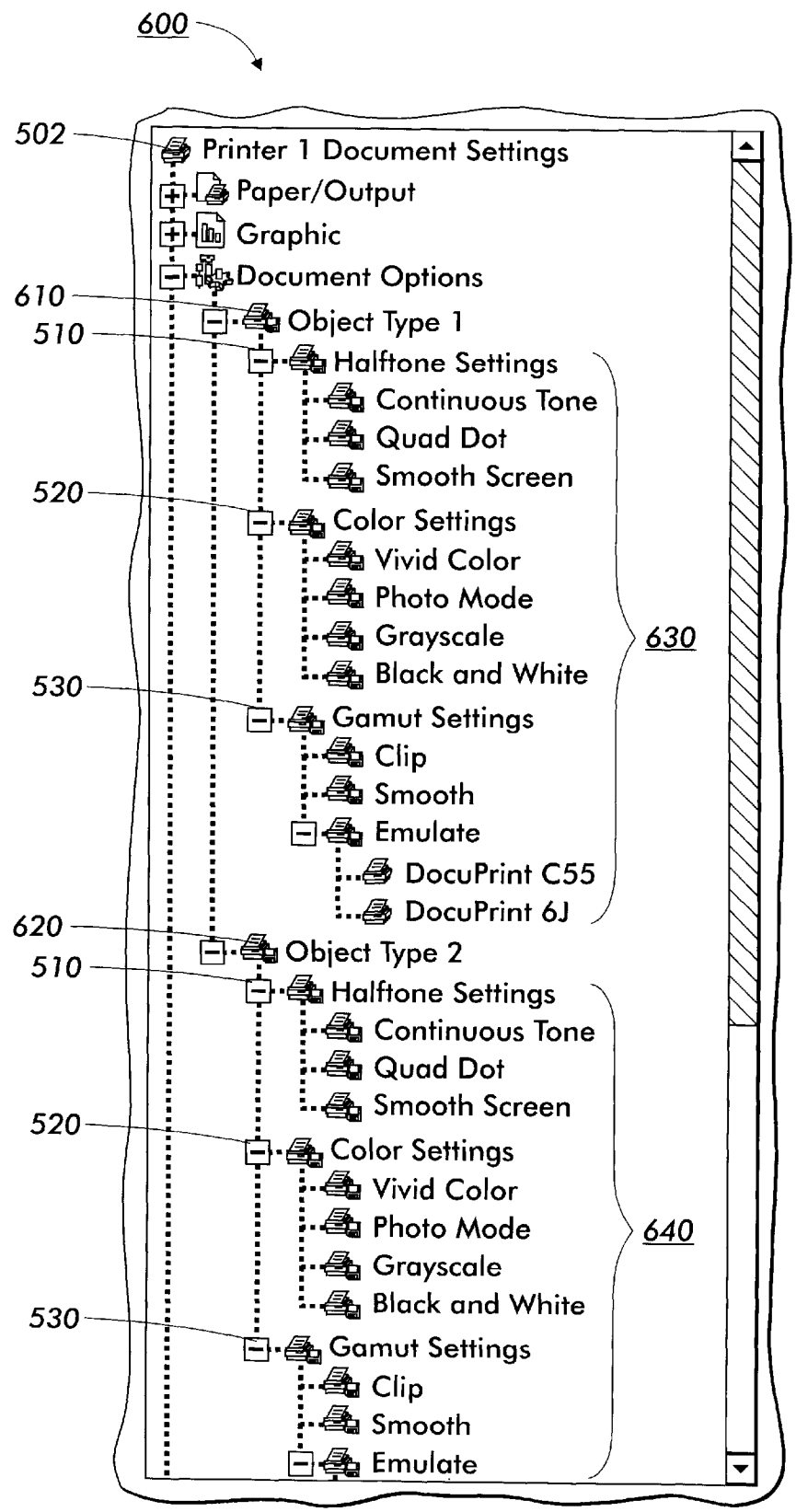
FIG. 5 is a second exemplary embodiment of a graphical user interface for selecting the rendering parameter options for each of a plurality of different types of objects for a particular document type.

FIG. 5 illustrates a second exemplary embodiment of a document type rendering parameter options selection graphical user interface 600. As shown in FIG. 5, the document type rendering parameter options selection graphical user interface 600 corresponds to the document type rendering parameter options selection graphical user interface 500 shown in FIG. 4. However, the document type rendering parameter options selection graphical user interface 600 allows rendering parameter options to be defined for more than one object in a single document type definition. That is, as shown in FIG. 5, if a particular document type will provide rendering parameters for more than one object type, one set of the various document rendering parameter portions 510, 520, 530 and the like can be provided for each such object type 610 and 620 for that document type.

In particular, in the exemplary embodiment of the document type rendering parameter options selection graphical user interface 600 shown in FIG. 5, a first set 630 of the various document rendering parameter portions 510, 520, 530 and the like are defined for a first object type 610. Then, a second set 640 of the various document rendering parameter portions 510, 520, 530 and the like are defined for a the other object types 620. It should be appreciated that, if the rendering parameter options for more than two different object types are to be defined, additional sets of the various document rendering parameter portions 510, 520, 530 and the like can be provided in the document type rendering parameter options selection graphical user interface 600.

Once the user has selected, for each selectable document type in the document type selection graphical user interface 400, the various rendering parameter options to be used to render each of the one or more different image object types defined in that document type, the user can then access the document type selection graphical user interface 400 to select a particular document type to be used when rendering any documents subsequently selected for printing.

As shown in FIG. 2, the systems, methods and graphical user interfaces for defining and using document types to select the rendering parameter options for different types of image objects on a document basis is implemented, in various exemplary embodiments, on a general purpose computer 100. However, the systems, methods and graphical user interfaces for defining and using document types to select the rendering parameter options for different types of image objects on a document basis can also be implemented on a special purpose computer, a programmed microprocessor or microcontroller and peripheral integrated circuit elements, and ASIC or other integrated circuit, a digital signal processor, a hard wired electronic or logic circuit such as a discreet element circuit, a programmable logic device such as a PLD, PLA, FPGA or PAL, or the like. In general, any device capable of implementing the systems, methods and graphical user interfaces described above can be used in place of the general purpose computer 100.

Accordingly, it should be understood that each of the elements of the general purpose computer 100, including the printer drivers stored in the printer driver memory portion 134, can be implemented as portions of a suitably programmed general purpose computer. Alternatively, each of these elements shown in FIG. 2 can be implemented as physically distinct hardware circuits within an ASIC, or using a FPGA, a PLD, a PLA, or a PAL, or using discreet logic elements or discreet circuit elements. The particular form of each of the elements shown in FIG. 2 will take is a design choice and will be obvious and predictable to those skilled in the art.

Similarly, it should be understood that the systems, methods and graphical user interfaces described above may be implemented as software executing on any one of the general purpose computer 100, the print server 300 and/or the printer 310. In general, the systems, methods and graphical user interfaces according to this invention can be implemented as software executing on a programmed general purpose computer, a programmed special purpose computer, a programmed microprocessor, or the like. In this case, the systems, methods and graphical user interfaces according to this invention can be implemented as portions of a printer driver, as resources residing on a print server or the like. Likewise, the systems, methods and graphical user interfaces of this invention can also be implemented by physically incorporating them into software and/or hardware systems, such as the hardware and software systems of a printer or a digital photocopier.

It should be appreciated that the systems, methods and graphical user interfaces of this invention are particularly useful with documents having one or more different content types. The contents, and thus the content types, of such documents can include text portions or objects, graphics portions or objects and photograph portions or objects, as well as mixed raster content images. For example, the content types could correspond to the various independent document layers of a document resulting from decomposing a document using the mixed raster content (MRC) decomposition technique. U.S. patent application Serial No. 09/xxx,xxx (Attorney Docket No. 104185), filed Nov. 3, 1999, incorporated herein by reference in its entirety, discusses decomposing a mixed raster content image into various independent layers. Such layers can include, for example, a background layer, a foreground layer, foreground-default-color layer, and the like.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for defining a document type, comprising:
   providing a list of rendering parameters;
   providing a list of rendering parameter options for each rendering parameter of the list of rendering parameters;
   receiving an input selecting a rendering parameter option for at least one rendering parameter of the list of rendering parameters; and
   subsequently associating, for each at least one rendering parameter, the selected rendering parameter option with that rendering parameter for documents of the document type so that any objects contained in any subsequently printed documents of the same document type are printed with the selected rendering parameter option associated with that document type independent of the object type of the objects.

2. The method of claim 1, further comprising, for any rendering parameter for which an input was not received, associating a default rendering parameter option with each such rendering parameter for that document type.

3. The method of claim 1, further comprising associating at least one set of rendering parameters with at least one document to be printed.

4. The method of claim 3, wherein associating at least one set of rendering parameters with at least one document to be printed comprises:
   providing a list of at least one of the defined document type;
   receiving at least one input selecting at least one predetermined document type from the list of at least one document type; and
   associating the at least one set of rendering parameters for each selected document type with the at least one document to be printed.

5. The method of claim 4, wherein receiving at least one input selecting at least one document type comprises receiving an input selecting a single document type.

6. The method of claim 5, wherein, when the selected single document type comprises a single set of rendering parameters, each at least one document to be printed is printed using that single set of rendering parameters for that entire document.

7. The method of claim 5, wherein, when the selected single document type comprises a plurality of sets of rendering parameters, different portions of each at least one document to be printed are printed using different ones of the plurality of sets of rendering parameters.

8. The method of claim 5, wherein, when the selected single document type comprises a plurality of sets of rendering parameters, associating the at least one set of rendering parameters for each selected document type with the at least one document to be printed comprises associating each selected document type with at least one different content type of the at least one document to be printed.

9. The method of claim 8, wherein each at least one document includes a plurality of different content types.

10. The method of claim 9, wherein the plurality of different content types comprises at least one of object types and mixed raster content layers.

11. The method of claim 4, further comprising:
providing a list of at least one image output device usable to print the at least one document; and
receiving an input selecting an image output device to be used to print the at least one document from the list of at least one image output device.

12. The method of claim 11, further comprising printing the at least one document on the selected image output device using the at least one set of associated rendering parameters for each selected document type.

13. The method of claim 3, further comprising associating the at least one document to be printed with an image output device.

14. The method of claim 13, wherein providing a list of rendering parameters comprises providing the list of rendering parameters based on the associated image output device.

15. A graphical user interface usable to associate various rendering parameter options for various rendering parameters with a document type, comprising:

a document type portion identifying a particular document type to which at least one rendering parameter option is to be associated;

at least one rendering parameter portion that indicates at least one rendering parameter of the identified document type; and at least one rendering parameter option portion that indicates at least one rendering parameter option for at least one of the rendering parameters indicated in the rendering parameter portion;

wherein each at least one rendering parameter option of the at least one rendering parameter option portion is selectable to be subsequently associated with documents of the particular document type identified in the document type portion so that any objects contained in any subsequently printed documents of the same document type are rendered with the selected rendering parameter option associated with that document type independent of the object type of the objects.

16. The graphical user interface of claim 15, further comprising a plurality of document content portions, each document content portion comprising at least one of the at least one rendering parameter portion and at least one rendering parameter option portion corresponding to the at least one rendering parameter portion.

17. The graphical user interface of claim 15, wherein each at least one rendering parameter of the at least one rendering parameter portion is selectable to display the corresponding rendering parameter options.

* * * * *